INVENTORS
ROY G. HYLDON
DORIS E. FINK
HALIM G. ABOUL-SAAD
BY Jerome R. Cox
ATTORNEY

United States Patent Office 3,450,692
Patented June 17, 1969

3,450,692
OXIDATION OF STARCH
Roy G. Hyldon, Doris E. Fink, and Halim G. Aboul-Saad, Columbus, Ohio, assignors to The Keever Company, Columbus, Ohio, a corporation of Ohio
Filed Feb. 5, 1965, Ser. No. 430,651
Int. Cl. C08b 19/04; C13l 1/08
U.S. Cl. 260—233.3                     6 Claims

ABSTRACT OF THE DISCLOSURE

A two-step method of oxidizing starch is described. The first, a partial oxidation step, is carried out in a manner to yield a relatively high ratio of starch-carbonyls to starch-carboxyl groups. The second step, starting with the product of the first step, is carried out in a manner to yield a different (or corrective) ratio of starch-carboxyl to starch-carbonyl groups. In this manner selected variation in the extent to which each step is carried out becomes a means for adjusting the carbonyl to carboxyl ratio to a predetermined value independently of the total degree of oxidation. The invention is particularly useful in providing for extremely rapid oxidation and in providing controllable starch substrates to which to add sulfite.

---

This invention relates to improved processes for the rapid production of oxidized starches and oxidized starch derivatives, and, more particularly, to such rapid processes in which the ratio of carbonyl radicals to carboxyl radicals in oxidized starch can be predetermined.

A known method of oxidizing starch to yield an oxidized product containing both carbonyl and carboxyl groups involves reacting starch with sodium hypochlorite. The sodium hypochlorite of commerce is quite alkaline but the reaction of starch with hypochlorite yields hydrogen ions and therefore the reaction, as now carried out, effects a progressive drop in pH. This reaction, because it is carried out under fixed starting conditions, yields carbonyl groups, carboxyl groups, and a total degree of oxidation at specific individual rates and, therefore, produces a fixed carbonyl to carboxyl ratio at each degree of total oxidation. The fact that the carbonyl to carboxyl ratio has not been a variant with respect to the total degree of oxidation in a starch oxidation reaction has seriously limited the attainment of oxidation products where the magnitude of the desired carbonyl to carboxyl ratio is at variance with the magnitude of the desired total carbonyl groups or at variance with the desired total degree of oxidation.

The term "variant" is therefore used herein to describe a ratio of carbonyl groups to carboxyl groups which is not determined by the total degree of oxidation or the absolute value of either the carbonyl groups or carboxyl groups produced in the reaction. In other words the term requires that the final magnitude of the carbonyl-carboxyl ratio, the final absolute magnitude of carbonyl groups present and the final absolute magnitude of carboxyl groups present are independent of each other.

It has heretofore been disclosed in the application of Roy G. Hyldon et al., filed May 21, 1962, Ser. No. 196,424, now abandoned, that valuable carbonyl enriched starch derivatives may be obtained by processes comprising, for example: (1) mixing starch slurry with a hypochlorite, (2) permitting the mixture to react, (3) reducing residual oxidizing forms of chlorine, and (4) mixing the oxidized starch with a minor proportion (about 0.2–10% by weight based on the weight of dry starch) of a sulfite salt selected from the group consisting of sodium sulfite, potassium sulfite, magnesium sulfite, and ammonium sulfite. In addition, it has also been heretofore disclosed in the application of Roy G. Hyldon and Doris E. Fink, filed Oct. 1, 1964, Ser. No. 400,809, now abandoned, that the rate of the starch-hypochlorite reaction can be substantially increased by the process which comprises, for example: (1) mixing starch and hypochlorite, (2) adjusting the pH of the mixture to about 8, (3) permitting the mixture to react, and (4) reducing residual oxidizing forms of chlorine. In this latter process also a minor proportion of a selected sulfite can be added to the oxidized starch in the absence of an oxidizing form of chlorine.

By "oxidizing forms of chlorine" we mean free chlorine, hypochlorite ion, hypochlorous acid or other molecular or ionic chlorine-containing entity which can react with starch for the oxidation thereof or which can oxidize a sulfite which may be added for the purpose of forming a starch-sulfite derivative. In a more practical sense an "oxidizing form of chlorine" would be one which gives a positive test to an ortho-tolidine indicator.

We have now discovered improved processes to produce: (1) a significant proportion of oxidized starches in a process requiring oxidation reaction periods measured in minutes rather than in hours as has been necessary heretofore; (2) oxidized starches enriched with both carboxyl radicals and carbonyl radicals; (3) oxidized starches in which the ratio of carbonyl radicals to carboxyl radicals can be predetermined independently of the degree of oxidation; and (4) oxidized starches which, because of the carbonyl and carboxyl radicals thereof occur in a predetermined variant ratio, provide the basis for the controlled preparation of a wide array of oxidized starch-sulfite products in a manner heretofore impossible. A related discovery is the provision of continuous processes for the rapid production of starches enriched with both carbonyl and carboxyl radicals wherein these radicals occur in predetermined variant proportions and wherein the oxidized starch may, if desired, be reacted with a selected sulfite salt to yield a unique array of products.

Heretofore, commercial processes for the production of carbonyl-carboxyl enriched starches have required reaction periods in the order of from 5 to 15 hours, depending on the degree of oxidation desired. Moreover, so far as applicants know, neither batch nor continuous processes have heretofore been known whereby oxidized starches enriched with carbonyl and carboxyl radicals in predetermined variant proportions may be obtained.

OBJECTS

An important object therefore of our invention is the provision of an improved process for the production of oxidized starch derivatives.

A further important object of our invention is a substantial reduction in the amount of time required to form carbonyl and carboxyl enriched starch derivatives.

A further object of our invention is the provision of a new process for the production of oxidized starch derivatives which permits of the attainment of a controlled variant ratio of carbonyl radicals to carboxyl radicals. A typical desired ratio is in the range of 0.3 carbonyl to 1.0 carboxyl to 2.5 carbonyl to 1.0 carboxyl. Even higher ratios up to many hundreds to 1 are possible.

A further object of our invention is the provision for the controlled preparation of a wide array of products resulting from the reaction of a selected sulfite salt with oxidized starches each containing a predetermined variant ratio of carbonyl radicals to carboxyl radicals.

A further object of our invention is the provision for a continuous process for the rapid production of an oxidized starch wherein the ratio of carbonyl radicals to carboxyl radicals is variant and can be predetermined.

We have now found that the foregoing and related objects can be obtained in a method of forming an oxidized starch derivative with a predetermined variant ratio of carbonyl radicals to carboxyl radicals, said method comprising, for example: (1) the step of oxidizing native starch by a process which yields a relatively high ratio of carbonyl radicals to carboxyl radicals; then (2) the step of oxidizing the resulting product by a process which yields a corrective ratio, in this instance a relatively high ratio, of carboxyl radicals to carbonyl radicals; and (3) limiting the extent of each step to produce the predetermined variant carbonyl-carboxyl ratio.

A preferred process which yields not only a relatively high ratio of carbonyl radicals to carboxyl radicals but also proceeds at a very high rate comprises (1) mixing a hypochlorite with a starch slurry; (2) adjusting the pH of the mixture to about 8; and (3) permitting the mixture to react until a desired degree of oxidation is attained. A preferred process which yields a relatively high ratio of carboxyl radicals to carbonyl radicals comprises (1) mixing a hypochlorite with an oxidized starch having a relatively high ratio of carbonyl radicals to carboxyl radicals; (2) adjusting the pH of the mixture to about 9.5; and (3) permitting the mixture to react until the predetermined variant carbonyl-carboxyl ratio is attained.

Other processes for the first step of attaining a relatively high carbonyl to carboxyl ratio may be substituted for the preferred process described which processes may include the use of oxidizing forms of halogen other than chlorine. One such process involving the production of dialdehyde starches is disclosed by Dvonch and Mehltretter in U.S. Patent No. 2,648,629 and describes the oxidation of starch with periodic acid. Starting with a dialdehyde starch and carrying out a limited oxidation by the said second step will produce extremely high ratios of carbonyl to carboxyl.

Similarly, other processes for the second step of attaining a relatively high carboxyl to carbonyl ratio may be substituted for the preferred process described.

It will be apparent to those skilled in the art that they may, on occassion, be required to carry out only said second step if the starting material is an oxidized starch with a higher carbonyl to carboxyl ratio than desired. Thus, one may purchase a dialdehyde starch and subject it to an oxidation process which yields a corrective ratio, in this instance, a relatively lower ratio, of carbonyl radicals to carboxyl radicals than occurs in dialdehyde starch and continue the reaction while progressively correcting, that is decreasing, the ratio until the desired variant carbonyl-carboxyl ratio is attained.

Similarly, one may possess an already partially oxidized starch with a relatively lower carbonyl-carboxyl ratio than desired. In this event, the said second step can be omitted and the partially oxidized starch can be further oxidized by a method which yields a corrective ratio, in this instance a relatively high carbonyl-carboxyl ratio and the reaction continued to progressively correct, that is increase, said ratio until the desired variant carbonyl-carboxyl ratio is attained.

As indicated in the foregoing discussion a corrective ratio of carbonyl radicals to carboxyl radicals is one which will change an existing ratio toward the predetermined variant ratio. Thus, if an existing carbonyl-carboxyl ratio of a partly oxidized starch is higher than the desired variant ratio, the corrective ratio, or carbonyl-carboxyl ratio of the subsequently used starch oxidation reaction, must be lower than the desired variant ratio. Similarly, if an existing ratio of a partly oxidized starch is lower than the desired variant ratio the corrective ratio, or carbonyl-carboxyl ratio of the subsequently used starch oxidation reaction, must be higher than the desired variant ratio. A "relatively high ratio" means a ratio higher than the desired variant ratio and a "relatively low ratio" is a ratio lower than the desired variant ratio.

As pointed out previously, and in order to take full advantage of the high velocity of oxidation possible in our process, we particularly prefer to start with native starch or relatively low oxidized starch, oxidize partly with a hypochlorite at a pH of about 8.0 and then oxidize further at a pH of about 9.5 while limiting the extent of each step to produce the desired variant carbonyl-carboxyl ratio.

Further objects and features of our inventions will be recognized from a reading of this specification and a consideration of the accompanying drawings and of the claims included hereinafter.

DETAILED DESCRIPTION

Figure 1:
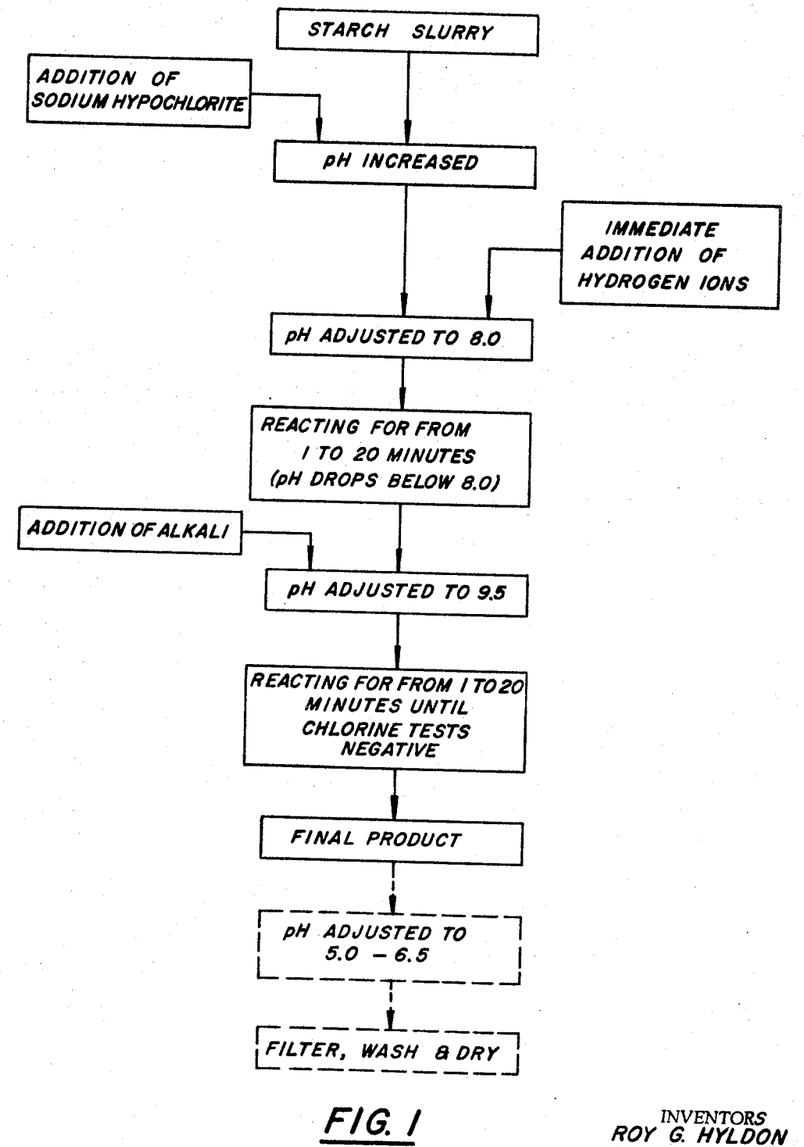
FIGURE 1 is a flow sheet illustrating a specific embodiment of our invention (see Example 1) relating to an improved process for the rapid production of oxidized starches wherein a specific variant ratio of carbonyl radicals to carboxyl radicals is predetermined.

A detailed description of a specific embodiment of our invention follows:

The initial step of our improved process has as its objective the oxidation of starch to yield a relatively high ratio of carbonyl radicals to carboxyl radicals and is illustrated in FIG. 1 by the addition of sodium hypochlorite to a raw starch slurry in the amount of about 0.1–20 percent by weight of sodium hypochlorite based on the dry weight of the starch. The amount of sodium hypochlorite used in any particular case depends upon the ultimate degree of oxidation desired in the total process. While the addition of suitable proportions of sodium hypochlorite tends to raise the pH to a level of from 10.0 to 12.5, we do not allow the mixture to remain at this pH level for any appreciable length of time. Rather, we add (immediately following the addition of the sodium hypochlorite), a source of hydrogen ions to adjust the pH to about 8.0. Sulfuric acid, hydrochloric acid, or other compatible acid may be used to effect this pH adjustment. We then permit the starch-hypochlorite mixture to react usually for from 1 to 20 minutes depending on the amount of oxidation desired and on the amount of sodium hypochlorite added. During this period the pH drops to a pH of about 4–7 depending on the extent of reaction permitted. We prefer to refer to this initial part of our process, as described above, as the "low pH reaction."

The second phase of our process has as its objective the further oxidation of the starch with the production of a relatively low ratio of carbonyl radicals to carboxyl radicals. At the appropriate time (and with further reference to FIG. 1) we add an alkali such as sodium hydroxide to adjust, to about 9.5, the pH of the mixture resulting from the low pH reaction. Then we permit this latter mixture to react, usually for a period of from 1 to 20 minutes. In those cases where the degree of oxidation is controlled by the use of stoichiometric quantities of hypochlorite the reaction is continued until the solution tests negative to oxidizing forms of chlorine with ortho-tolidine indicator. Alternatively, we can use excess hypochlorite and stop the reaction at any time by adding an antichlor suitable for reducing residual oxidizing forms of chlorine present in the reaction mixture. Suitable reducing agents are sulfites and bisulfites.

Other alkaline materials besides sodium hydroxide may be used to adjust the pH to about 9.5 but strong alkalies such as sodium hydroxide or potassium hydroxide should be added with care to avoid localized overheating of the reaction mixture. A pH drop will occur in this portion of the process as the reaction continues and it may be desirable to adjust the pH to about 9.5 from time to time to maintain maximum control on the relative rate of production of carboxyl and carbonyl radicals. This second phase of the reaction may be terminated by adding a bisulfite, a sulfite, or the like to remove the oxidizing forms of chlorine which may be present or, if the initial quantity of sodium hypochlorite was limited, the reaction may be terminated by permitting all such oxidizing form of chlorine to react with starch. Completion of the reaction, as indicated above, occurs when a negative test is obtained with ortho-tolidine. We prefer to refer to this second phase of the reaction as the "high pH reaction."

At the completion of the high pH reaction we usually adjust the pH of the mixture to about 5–6.5, filter, wash, and dry the final product.

As indicated above an important objective of our invention illustrated by the embodiment shown in FIG. 1, is the production of oxidized starches containing predetermined variant proportions of carbonyl radicals and to carboxyl radicals. A convenient way to control the ratio of carbonyl radicals to carboxyl radicals is to control the ratio of the time for the high pH reaction to the time for the low pH reaction. For example, if the low pH reaction is permitted to continue for 2 minutes and the high pH reaction is permitted to continue for 10 minutes, we form a product with a relatively lower carbonyl to carboxyl ratio as compared to the product formed if the low pH reaction is permitted to continue for 10 minutes and the high pH reaction is permitted to continue for 2 minutes.

Figure 2:
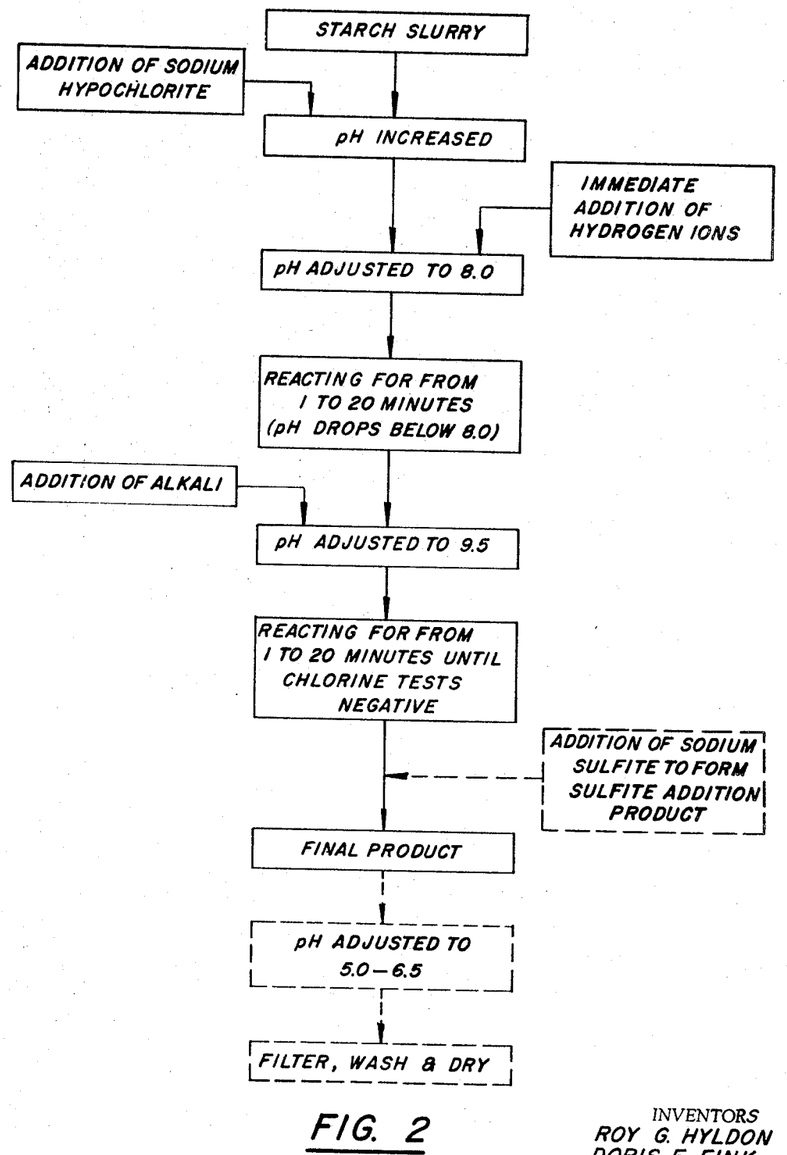
FIGURE 2 is a flow sheet illustrating a similar type process wherein we obtain an oxidized starch product containing a specific predetermined variant ratio of carbonyl radicals to carboxyl radicals and wherein we react the oxidized product with a selected sulfite salt.

We have also found, as illustrated in FIG. 2, that a wide array of desirable oxidized starch derivatives may be obtained by the optional addition of a selected sulfite to the oxidized starches which are produced as described immediately above. The selected sulfite may be sodium sulfite, potassium sulfite, ammonium sulfite, or magnesium sulfite. We proceed as previously described with the exception that following the high pH reaction we reduce any residual oxidized forms of chlorine and then add the selected sulfite salt in the amount of about 0.1–10 percent by weight based on the dry weight of the starch to form a sulfite addition product. Sodium sulfite is preferred in this step. In the event a process has been used which uses an oxidizing form of halogen other than chlorine such residual oxidizing forms of halogen are also reduced prior to the sulfite addition.

It will be noted that sodium sulfite can serve two functions—(1) reduce residual oxidized forms of chlorine or other halogen which may be present, and (2) form addition products with carbonyl enriched starch, as disclosed in application Serial No. 196,424. Therefore, these latter two steps may be combined with a single addition of sufficient sodium sulfite. However, if a bisulfite is used to reduce the residual oxidizing forms of chlorine then a sulfite must be added to form the addition product for the reason that bisulfite salts do not form addition products with carbonyl enriched starches. Further, the sulfite addition to the starch occurs only to starch which contains a significant quantity of carbonyl radicals inasmuch as there appears to be no significant change in properties when the selected sulfite is added to an oxidized starch wherein substantially all the oxidation has resulted in carboxyl radicals.

Figure 3:
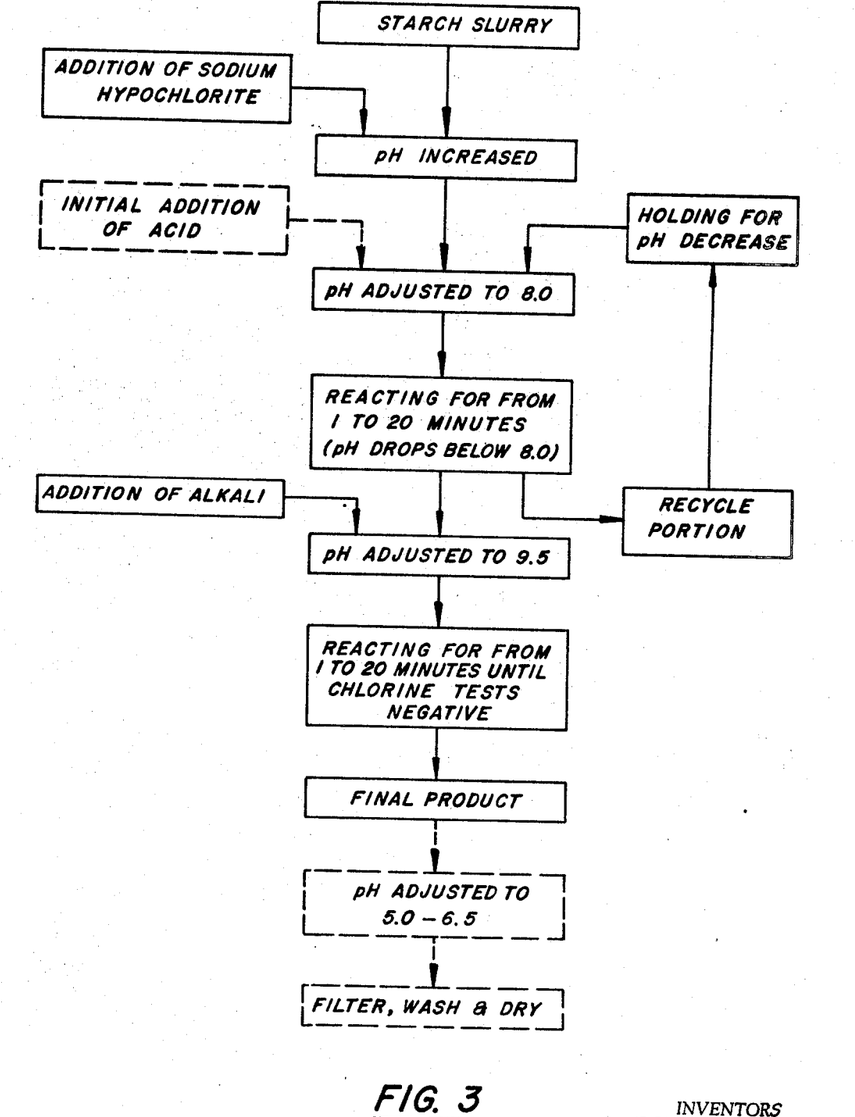
FIGURE 3 is a flow sheet illustrating a specific embodiment of our invention wherein there is provision for a continuous type process for the rapid production of oxidized starches and wherein a specific variant ratio of carbonyl radicals to carboxyl radicals is predetermined.
Figure 4:
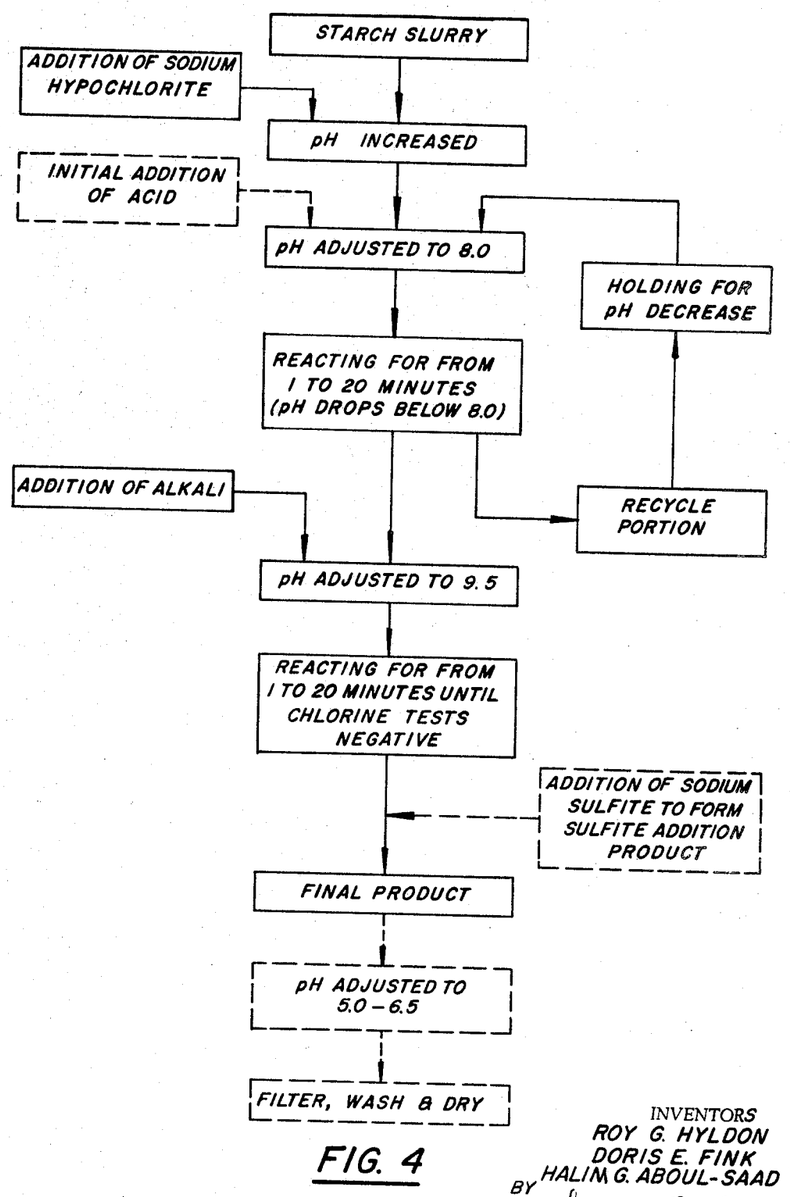
FIGURE 4 is a flow sheet illustrating a process similar to that illustrated in FIG. 3 wherein we obtain an oxidized starch product containing a specific predetermined variant ratio of carbonyl radicals to carboxyl radicals and wherein we react the oxidized product with a selected sulfite salt.

A further related embodiment of the invention relates to the continuous production of oxidized starches as illustrated in FIGS. 3 and 4.

In such continuous processes (see FIG. 3), the pH of the starch-sodium hypochlorite mixture is initially adjusted by an acid to a pH of about 8.0, and thereafter the mixture is permitted to react for a period of from 1 to 20 minutes as desired. We then divide the mixture into two portions, a recycle portion and a production portion. We add an alkali to the production portion to adjust the pH thereof to about 9.5; permit the mixture to react for a period of from 1 to 20 minutes; that is, until the mixture tests negative to chlorine or, alternatively, until the reaction is terminated at a desired time by the addition of an antichlor. We then filter, wash, and dry the product.

In the continuous type recycle process we return to the initial starch-hypochlorite slurry the recycle portion of the mixture from the low pH reaction when the pH of the latter mixture has dropped to, for example, about 3 or 4. By this means we can adjust the pH of the initial mixture to a pH of about 8.0, the quantity of reaction mixture recycled depending on its pH. This provision eliminates the need for an external source of hydrogen ions.

When the continuous process is first initiated we find it advantageous to adjust the pH of the initial slurry to about 8.0 by adding only an inorganic acid, thereby eliminating the necessity of conducting the recycle process for a period of time before the process arrives at equilibrium. Also, at times we supplement the recycle slurry with an acid to speed up production at the expense of the additional cost of the acid.

As shown in FIG. 4, the recycle of the low pH reacted slurry to the initial sodium hypochlorite-starch slurry to adjust the pH thereof downward for the low pH reaction may be used in making continuously a starch product having a predetermined variant carbonyl-carboxyl ratio to which the selected sulfite salt is to be added.

The final reaction mixture, after all residual oxidizing forms of chlorine have been removed and whether or not the sulfite addition product has been formed, is usually adjusted to a pH of about 5–6.5. The product is then filtered, washed, and dried.

Figure 5:
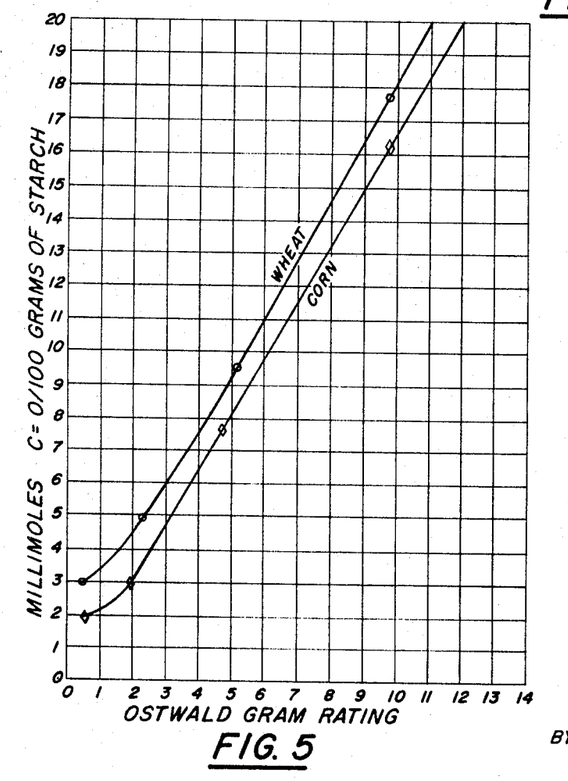
FIGURE 5 is a graph of carbonyl content of an oxidized starch, oxidized by the method of the present invention, versus the Ostwald gram rating, the significance of which will be discussed more fully hereinafter.

Before illustrating our invention with specific examples it is desirable to consider the relationship between the carbonyl content of an oxidized starch and its Ostwald gram rating which relationship, under the conditions of the examples to be discussed, is shown in the graphs of FIG. 5. The determination of the carbonyl and carboxyl content of the numerous samples of oxidized starch which we have the occasion to handle can be a very tedious and time consuming task. Fortunately the progress of the selected starch oxidation reactions can be followed very easily by determining the Ostwald gram rating of successive samples taken from the reaction mixture at specific time intervals. As shown in FIG. 5, in the range of Ostwald gram rating of about 0.5–12, of special interest here and in the reactions being used by way of example, the Ostwald gram rating is proportional to the carbonyl content of the oxidized starch. Results of typical determinations of the relationship between Ostwald gram rating and carbonyl content are shown in FIG. 5 for both wheat starch and corn starch.

It is also a fact that decreases in carbonyl content during the oxidation of starch reflect themselves mathematically by a corresponding increase in the carboxyl content. This is substantially a 1 to 1 relationship and indicates that a carboxyl group is the relatively stable oxidation product of a carbonyl group during starch oxidation. Thus the initial oxidation of starch with hypochlorite at a pH of about 8.0 gives successive products with higher Ostwald gram ratings and therefore higher absolute quantities of carbonyl groups. Tihs is shown for example, in curve A of FIG. 6. As we have already pointed out, we have found that the carboxyl production during the low pH phase of the reaction is relatively low compared to the carbonyl production. However, when the pH of the reaction mixture is adjusted to 9.5 (as at point B in FIG. 6) carbonyl groups oxidize to carboxyl groups at a rate faster than their formation from starch and the Ostwald gram rating shows a net reduction in carbonyl groups as well as a relatively lower carbonyl-carboxyl ratio.

In determining the Ostwald gram ratings, or viscosities, of the products of the examples, the following apparatus, reactants, and method were used in all cases.

Apparatus:
    Ostwald—Fenske Viscometer, #200.
    Constant speed stirrer—adjusted to 150 r.p.m.
    Propeller type agitator.
    Constant temperature water bath—40° C.
    Stop watch (0.1 second graduations).
    0.500 N sodium hydroxide solution.
    250 ml. beakers, etc., 50 ml. buret, 10 ml. pipet.
    100 ml. measuring cylinder.

Method:
(1) Weigh starch powder to desired weight (dry basis) nearest 0.01 gm.
(2) Transfer to 250 ml. beaker.
(3) Add distilled water from buret to obtain thick, but lump-free paste (approximately mls. H$_2$O for gms. starch).
(4) Mix water-starch paste with glass stirring rod until completely smooth.
(5) Add distilled water to bring total water added to 8.0 mls.—mix well.
(6) Using less than 2.0 mls. of water from buret, wash starch from stirring rod into beaker.
(7) Add water from buret to bring total water added to 10.0 mls.
(8) Put starch beaker into water bath, and agitate with constant speed stirrer, 150 r.p.m.
(9) Add 90.0 mls. 0.5 N NaOH, start stop watch.
(10) Stir starch-alkali suspension until completely lump free—not less than 3 minutes.
(11) Transfer 10.0 mls. from beaker to Ostwald viscometer with pipet.
(12) Draw up into viscometer calibrated limb, and hold it there for 9 minutes before timing flow from upper to lower mark.

The starch weight (dry basis) in grams required to give a flow time of 32.5 seconds (±2.5 seconds) is recorded as the "fluidity" or Ostwald gram rating of the starch. Using this method, untreated thick wheat starch should give a "fluidity" or rating of 0.55 gms. (±0.05 gm.).

Figure 6:
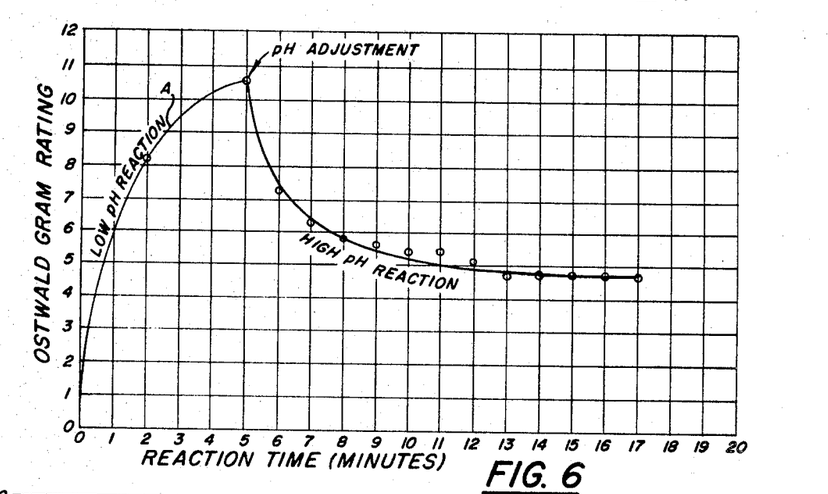
FIGURE 6 is a graph of changes in Ostwald gram rating versus reaction time during the oxidation of starch with sodium hypochlorite, starting at a pH of 8.0, continuing the reaction for 5 minutes, then adjusting the pH to 9.5, and then continuing the reaction for an additional 12 minutes (see Example 1)
Figure 7:
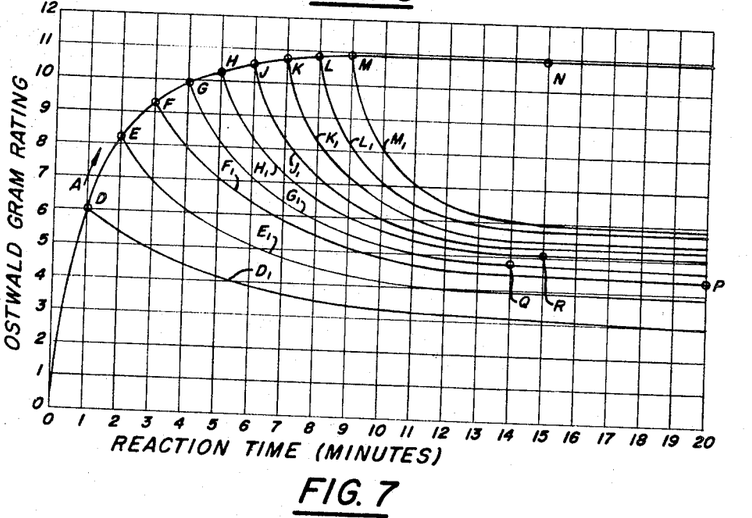
FIGURE 7 is a graph comprising a family of curves showing the variation of Ostwald gram rating with reaction time when starch is oxidized with sodium hypochlorite first at an initial pH of 8.0, then continuing the reaction for various periods of 1, 2, 3, 4, 5, 6, 7, 8, and 9 minutes, then in each instance adjusting the pH to 9.5 then continuing the oxidation for a total of 20 minutes (see Example 3)

Reference is now made to FIG. 7 which is a graph made up of a family of curves wherein each curve was constructed in the manner illustrated in Examples 1 and 3 and wherein each curve is similar to the single curve of FIG. 6. For example, curve A shows the change in Ostwald gram rating with time for a low pH reaction of starch with sodium hypochlorite. When the reaction mixture is adjusted to a pH of 9.5 after 1 minute (as at point D) the Ostwald gram rating then follows curve $D_1$. If the low pH reaction mixture is converted into a high pH reaction mixture after 2 minutes (as at point E) the Ostwald gram rating follows curve $E_1$. Similarly, the low pH reaction mixture can be converted to high pH reaction mixtures at any of the time points F, G, H, J, K, L, or M, and the Ostwald gram rating follows the curves $F_1$, $G_1$, $H_1$, $J_1$, $K_1$, $L_1$, and $M_1$, respectively.

Figure 8:
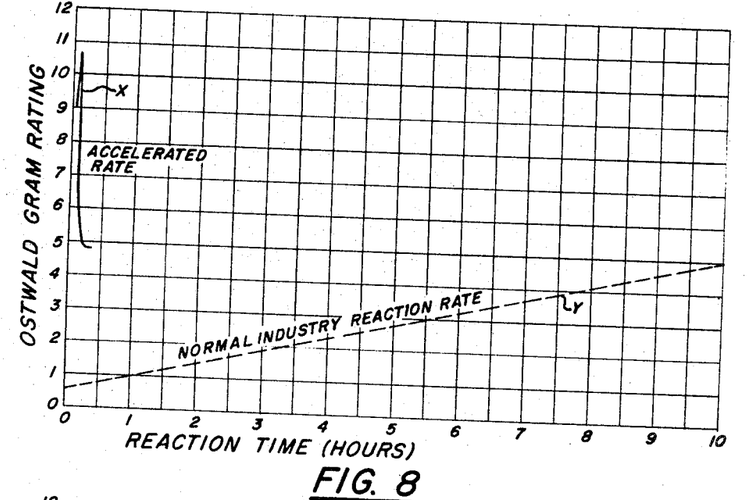
FIGURE 8 is a graph of the accelerated reaction rate obtainable in the method of the invention compared with the reaction rate obtainable in a typical starch oxidation of the prior art.

It will be noted that the abscissa of each of the graphs of FIGS. 6 and 7 is time in minutes. This reflects the fact that a complete oxidation with commonly used proportions of sodium hypochlorite can be effected in about 10–30 minutes. This is in sharp contrast with methods used heretofore wherein oxidation rates were measured in hours. In this connection reference is made to FIG. 8 which shows a comparison between reaction velocities attainable with the present method (curve X) as compared with a typical reaction velocity attained in methods used industrially (curve Y). The graph shows that the degree of oxidation reached in about 10 hours in accordance with curve Y can be reached in about 10 minutes in accordance with curve X.

EXAMPLE 1

We started with 2688 grams of wheat starch on a dry basis. To this we added 2.0% by weight of a 4.9% solution of sodium hypochlorite (900 ml.). We then immediately adjusted the pH of the slurry to a pH of 8.0 by the addition of hydrochloric acid and permitted the oxidation to proceed for a period of 5 minutes. We next adjusted the pH of the reaction mixture to 9.5 by the addition of soda ash, permitted the oxidation to continue, and took samples after 0, 1, 2, 3, 4, 5, 6, 7, 8, 9, 10, 11, and 12 minutes of high pH oxidation. Sodium bisulfite was added immediately to each sample to neutralize the excess oxidizing forms of chlorine. Finally we adjusted the pH of the samples to a pH of 5.5 and tested for Ostwald gram rating (O.G.R.) by the procedure described previously. The results of these tests, shown below, were used to construct the graph of FIG. 6.

| Time after soda ash addition (min.): | O.G.R. (grams) |
|---|---|
| 0 | 10.60 |
| 1 | 7.33 |
| 2 | 6.25 |
| 3 | 5.79 |
| 4 | 5.63 |
| 5 | 5.36 |
| 6 | 5.32 |
| 7 | 5.07 |
| 8 | 4.80 |
| 9 | 4.80 |
| 10 | 4.80 |
| 11 | 4.80 |
| 12 | 4.80 |

In the foregoing example we found after 5 minutes of low pH reaction that the carbonyl-carboxyl ratio was 1.38 wherein it was 0.52, 0.34, and 0.31 after 2, 6, and 10 minutes respectively of high pH reaction.

EXAMPLE 2

We started with 2598 grams of wheat starch on a dry basis. To this we added 2.0 percent by weight of a 5.6% solution of sodium hypochlorite (758 ml.). We then immediately adjusted the pH of the slurry to 8.0 by the addition of dilute sulfuric acid. We took samples of this slurry at intervals of 5, 6, 7, 8, and 9 minutes. On one sample taken at 5 minutes from the low pH reaction we neutralized the residual oxidizing forms of chlorine with sodium sulfite and determined the Ostwald gram rating of the resulting product. In other samples we adjusted the pH of the mixture to 9.5 and permitted the oxidation of the starch to continue until a negative reaction for oxidizing forms of chlorine was obtained through the use of an ortho-tolidine indicator. Next we adjusted the pH of all examples to a pH of 5.5 and tested for Ostwald gram ratings by the procedure described previously. The results of these tests are shown below:

| Time at pH of 8.0 (min.) | O.G.R. (grams) | Time after soda ash addition (min.) | O.G.R. (grams) |
|---|---|---|---|
| 5 | 10.0 | 8 | 4.83 |
| 6 | | 7.5 | 5.0 |
| 7 | | 7 | 5.2 |
| 8 | | 6 | 5.45 |
| 9 | | 6 | 5.65 |

In the foregoing example we found after 5 minutes of low pH reaction, for example, the carbonyl-carboxyl ratio was 1.38 whereas after 5 minutes of low pH reaction and 8 minutes of high pH reaction the ratio was 0.43.

EXAMPLE 3

We started with 2704 grams of wheat starch on a dry basis. To this we added 2.0 percent by weight of a 6.44% solution of sodium hypochlorite (700 ml.). We then immediately adjusted the pH of the slurry to a pH of 8.0 by the addition of dilute sulfuric acid. We took samples of this slurry at intervals of 2, 3, 4, 5, 15 and 30 minutes. To one aliquot of each sample we added sufficient soda ash to adjust the pH to 9.5 and we then permitted the mixture to react until a negative reaction for chlorine was obtained through the use of an ortho-tolidine indicator. To a second aliquot of each sample we immediately added sodium sulfite to neutralize the excess chlorine to stop the oxidation reaction. When the reaction was completed in each aliquot it was adjusted to a pH of 5.5 and tested for Ostwald gram ratings by the procedure described previously. The results of these tests, shown below, are typical of those used to construct the graph of FIG. 7.

| Time at pH of 8.0 (min.) | O.G.R. (grams) | Point on fig. | Time following pH adjustment to 9.5 (min.) | O.G.R. (grams) | Point on fig. |
|---|---|---|---|---|---|
| 2 | 8.2 | E | 28 | 3.87 | |
| 3 | 9.35 | F | 17 | 4.35 | P |
| 4 | 9.90 | G | 10 | 4.73 | Q |
| 5 | 10.30 | H | 10 | 5.04 | R |
| 15 | 10.87 | N | | | |
| 30 | 10.67 | | | | |

In the foregoing example we found after 2 minutes of low pH reaction, for example, that the carbonyl-carboxyl ratio was 1.4 which is relatively high whereas when this same reaction mixture was adjusted to a pH of 9.5 and permitted to react for 28 minutes the carbonyl-carboxyl ratio was found to be 0.4 which is relatively low.

EXAMPLE 4

The carbonyl-carboxyl ratio, as well as the Ostwald gram rating, attained in the low pH reaction in a given time will depend somewhat on the concentration of sodium hypochlorite. This is illustrated in an example where we started with 900 grams of wheat starch (dry basis) in each of three reaction vessels and added, respectively, one half percent by weight (58 ml. of 6.4% sodium hypochlorite), one percent (115 ml. of 6.4% sodium hypochlorite), and 4 percent (460 ml. of 6.4% sodium hypochlorite) to the reaction vessels to make starch slurries. The pH in each case was adjusted to 8.0 with dilute hydrochloric acid and the mixtures were permitted to react for 8 minutes. Samples were analyzed at this point. The mixtures were then adjusted to a pH of 9.5 with soda ash and the oxidation was permitted to continue until ortho-tolidine indicator showed that there were no residual oxidizing forms of chlorine present. Results were as follows (carbonyl and carboxyl contents are given in millimoles per 100 grams of starch).

| Percent NaClO | Low pH (min.) | O.G.R. | CO | COOH | CO/COOH | Final CO/COOH |
|---|---|---|---|---|---|---|
| 0.5 | 8 | 2.8 | 4.9 | 3.9 | 1.26 | 0.80 |
| 1.0 | 8 | 5.4 | 9.2 | 6.4 | 1.44 | 0.48 |
| 4.0 | 8 | 15.8 | 36.5 | 15.9 | 2.30 | 0.7 |

EXAMPLE 5

The previous examples were repeated and the reaction mixtures resulting from the high pH reaction were treated with sodium bisulfite to reduce any residual oxidizing forms of chlorine. Samples of the resulting mixtures were treated, respectively, with varying minor proportions, between 0.1 and 10% by weight (dry starch basis), of sulfite salts selected from the group: sodium sulfite, potassium sulfite, magnesium sulfite, and ammonium sulfite. A wide array of starch-sulfite products were produced which differed from the untreated oxidized starches in a characteristic sharp lowering of their peak viscosities, minimum viscosities, and setback viscosities.

It is to be understood that while the foregoing specific examples refer to preferred embodiments of our invention they are for purposes of illustration only and that the invention is not limited to the precise form disclosed and various changes may be made therein without departing from the scope of the invention which is defined by the following claims.

We claim:
1. A method of rapidly forming starch derivatives which comprises
   (1) mixing a hypochlorite with a starch slurry;
   (2) adjusting the pH of said slurry to about 8.0;
   (3) permitting the mixture to react to partially oxidize said starch;
   (4) adjusting the pH of the resulting mixture to about 9.5;
   (5) permitting the mixture to react to a desired degree of oxidation; and
   (6) reducing any residual oxidizing forms of chlorine.
2. The method according to claim 1 wherein the hypochlorite is sodium hypochlorite.
3. The method according to claim 1 wherein the hypochlorite is about 0.1–20% sodium hypochlorite based on the weight of the starch.
4. The method according to claim 1 wherein the said pH adjustment to about 8.0 is effected by recycling a portion of partially oxidized starch-hypochlorite mixture.
5. A process of forming starch derivatives which comprises
   (1) mixing with a starch slurry about 0.1–20% by weight of sodium hypochlorite based on the weight of the starch;
   (2) adjusting the pH of the mixture to about 8.0;
   (3) permitting the mixture to react for a period of about 1–20 minutes;
   (4) then adjusting the pH of the mixture to about 9.5;
   (5) permitting the mixture to react for a period of about 1–20 minutes; and
   (6) then reducing any residual oxidizing forms of chlorine.
6. The method according to claim 5 wherein the said pH adjustment to about 8.0 is effected by recycling a portion of partially oxidized starch-hypochlorite mixture.

References Cited

Whistler et al. (I), "Oxidation of Amylopectin With Hypochlorite at Different Hydrogen Ion Concentrations," J.A.C.S. 79 pp. 6460–64 (1956).

Whistler et al. (II), "Action of Alkaline Hyprochlorite on Corn Starch Amylose." J.A.C.S. 78, pp. 4704–4709 (1956).

DONALD E. CZAJA, *Primary Examiner.*

R. W. MULCAHY, *Assistant Examiner.*